United States Patent
Zhang et al.

(10) Patent No.: US 10,078,740 B2
(45) Date of Patent: Sep. 18, 2018

(54) METHOD TO FETCH FUNCTIONALITY ACROSS APPLICATIONS

(71) Applicant: Google LLC, Mountain View, CA (US)

(72) Inventors: Guangqiang Zhang, Sunnyvale, CA (US); Manuel Frank Martinez, San Francisco, CA (US); Zhiwei Guan, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 229 days.

(21) Appl. No.: 14/884,978

(22) Filed: Oct. 16, 2015

(65) Prior Publication Data

US 2016/0154557 A1 Jun. 2, 2016

Related U.S. Application Data

(60) Provisional application No. 62/086,076, filed on Dec. 1, 2014.

(51) Int. Cl.

| | | |
|---|---|---|
| *G06F 3/0484* | (2013.01) | |
| *G06F 21/31* | (2013.01) | |
| *G06F 3/16* | (2006.01) | |
| *G06F 3/0481* | (2013.01) | |
| *G06F 9/445* | (2018.01) | |
| *H04L 29/08* | (2006.01) | |

(Continued)

(52) U.S. Cl.
CPC ............ *G06F 21/31* (2013.01); *G06F 3/0481* (2013.01); *G06F 3/16* (2013.01); *G06F 9/4451* (2013.01); *G06F 9/451* (2018.02); *H04L 67/125* (2013.01); *H04L 67/38* (2013.01)

(58) Field of Classification Search
CPC .......... G06F 3/00; G06F 3/048; G06F 3/0481; G06F 3/0484; G06F 3/04842; G06F 9/44; G06F 9/4443; G06F 17/30; G06F 21/00; G06F 21/31; H04L 9/32
See application file for complete search history.

(56) References Cited

U.S. PATENT DOCUMENTS

| | | |
|---|---|---|
| 6,006,278 A | 12/1999 | Cottrill |
| 2006/0294578 A1 | 12/2006 | Burke |

(Continued)

FOREIGN PATENT DOCUMENTS

WO 2013/163426 10/2013

OTHER PUBLICATIONS

Extended European Search Report issued in European Application No. 15182812.6 dated Mar. 7, 2016, 7 pages.

*Primary Examiner* — Xiomar L Bautista
(74) *Attorney, Agent, or Firm* — Fish & Richardson P.C.

(57) ABSTRACT

A method and system for fetching functionalities across various user interfaces and providing, for execution, instructions to invoke a function that is not present at a particular user interface are disclosed. The method implemented in the system can include receiving i) data identifying a first function associated with a first user interface, and ii) instructions for invoking the first function in one or more user interfaces; receiving, from a second user interface, a request for invoking the first function; selecting, using a processor, an instruction configured to invoke the first function in the second user interface; transmitting the instruction to the second user interface; and invoking, using the transmitted instruction, the first function in an application associated with the second user interface.

20 Claims, 5 Drawing Sheets

(51) Int. Cl.
*H04L 29/06* (2006.01)
*G06F 9/451* (2018.01)

(56) References Cited

U.S. PATENT DOCUMENTS

| | | |
|---|---|---|
| 2009/0158213 A1 | 6/2009 | Ryu |
| 2011/0055918 A1 | 3/2011 | Keefe |
| 2011/0271184 A1 | 11/2011 | Sima et al. |
| 2015/0288747 A1* | 10/2015 | Olenick .................. H04L 67/10 |
| | | 709/203 |

* cited by examiner

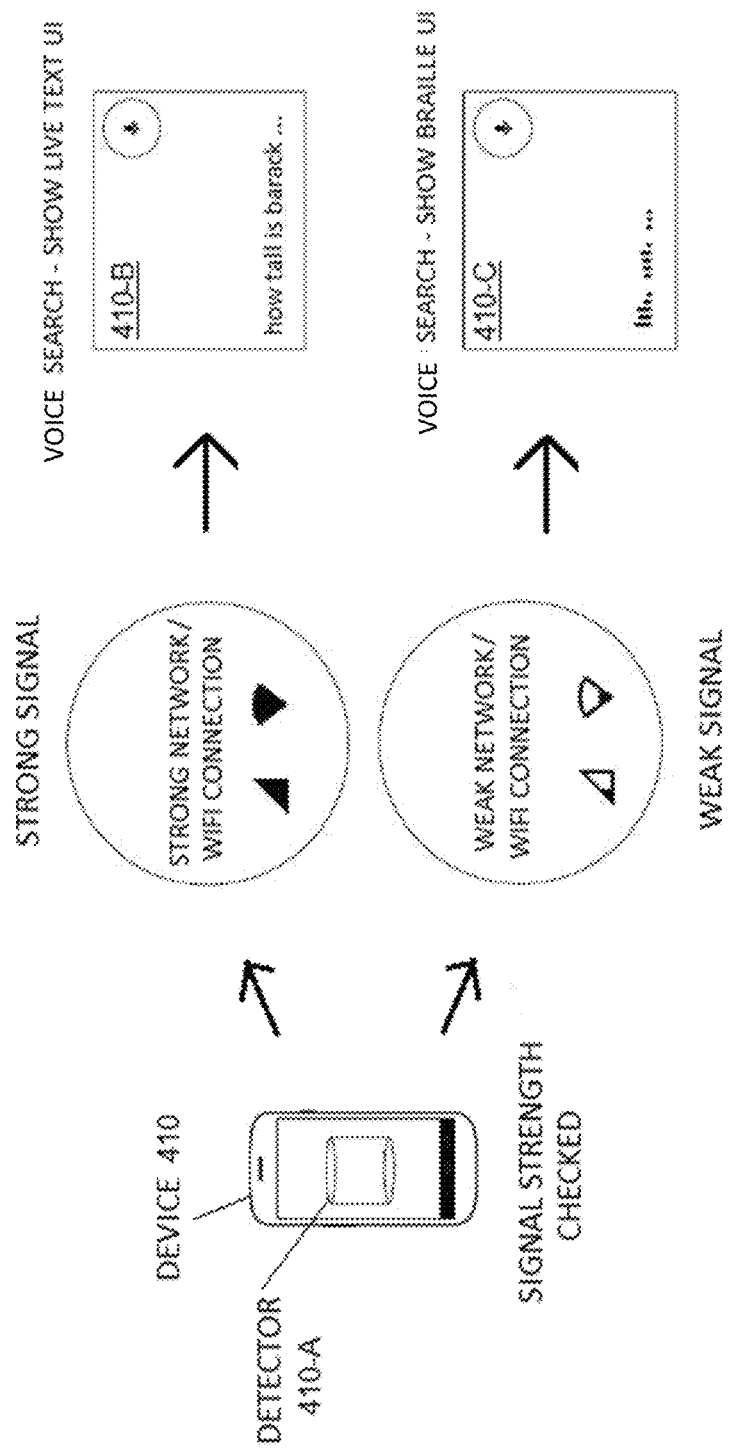

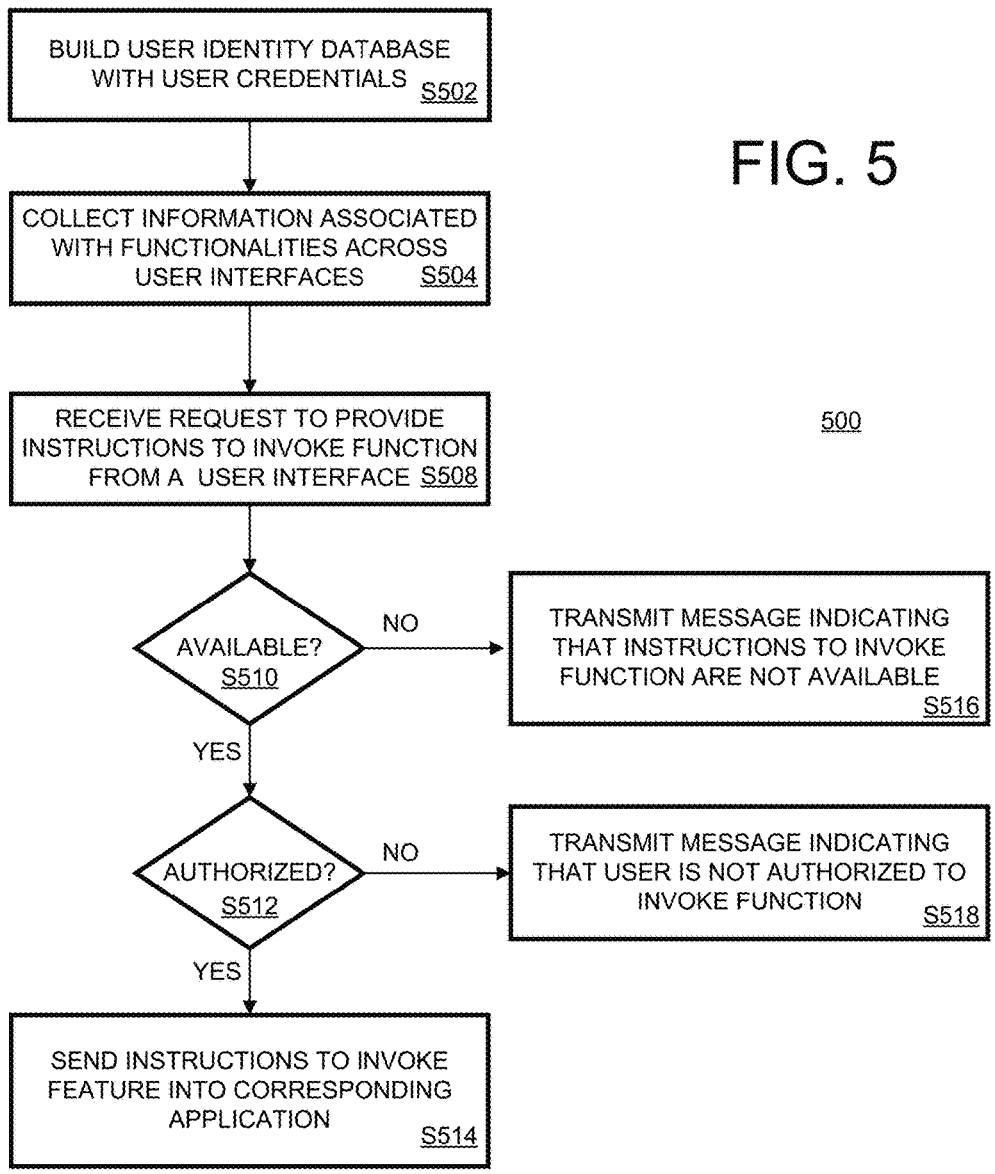

METHOD TO FETCH FUNCTIONALITY ACROSS APPLICATIONS

CROSS REFERENCE TO RELATED APPLICATION

This application claims the benefit of U.S. provisional patent application No. 62/086,076, filed on Dec. 1, 2014, which is incorporated by reference herein.

FIELD

This disclosure generally relates to the fetching and provision of functions across applications.

BACKGROUND

Computer applications can be implemented and executed on various devices with the same or different functions. A user may, however, experience inconveniences because certain functions may not be provided with a particular user interface (e.g., application, device, entry point), but are provided at other user interfaces. For instance, a particular user interface may not provide voice search functionality and therefore may not be able to provide internet search functionality using the user's voice. However, another user interface may provide voice search functionality, and the user may therefore be able to conduct an internet search using the user's voice. Accordingly, a user may have different experiences depending on the user interface being used by the user. Therefore, a method to fetch and provide functionality across various user interfaces is needed to alleviate such user inconveniences and provide a more consistent experience for a user.

SUMMARY

This disclosure generally describes a method and system for fetching functionalities across various user interfaces and providing, for execution, instructions to invoke a function that is not present at a particular user interface.

Innovative aspects of the subject matter described in this specification may, in some implementations, be embodied in a computer-implemented method that includes actions of receiving i) data identifying a first function associated with a first user interface, and ii) instructions for invoking the first function in one or more user interfaces; receiving, from a second user interface, a request for invoking the first function; selecting, using a processor, an instruction configured to invoke the first function in the second user interface; transmitting the instruction to the second user interface; and invoking, using the transmitted instruction, the first function in an application associated with the second user interface.

In some implementations, a non-transitory computer-readable storage medium is provided and includes instructions, which, when executed by one or more computers, cause the one or more computers to perform actions. The actions include receiving i) data identifying a first function associated with a first user interface, and ii) instructions for invoking the first function in one or more user interfaces; receiving, from a second user interface, a request for invoking the first function; selecting, using the one or more computers, an instruction configured to invoke the first function in the second user interface; transmitting the instruction to the second user interface; and invoking, using the transmitted instruction, the first function in an application associated with the second user interface.

In some implementations, a system includes one or more computers and one or more storage devices storing instructions that are operable and when executed by one or more computers, cause the one or more computers to perform actions. The actions include receiving i) data identifying a first function associated with a first user interface, and ii) instructions for invoking the first function in one or more user interfaces; receiving, from a second user interface, a request for invoking the first function; selecting, using the one or more computers, an instruction configured to invoke the first function in the second user interface; transmitting the instruction to the second user interface; and invoking, using the transmitted instruction, the first function in an application associated with the second user interface.

Other embodiments of these aspects include corresponding systems, apparatus, and computer programs, configured to perform the actions of the methods, encoded on computer storage devices.

These and other embodiments may each optionally include one or more of the following features. For instance, receiving the request includes receiving a user credential of a user of the second user interface. The plurality of user interfaces includes applications, devices, and entries to the applications associated with the user. The instruction for invoking the first function is selected in response to verifying that the user of the second user interface is authorized to use the first function based on the user credential of the user of the second user interface. The request for invoking the first function is received according to a priority order that is based on at least one of a frequency of use of the first function by a user, a user customization, a user status, a similarity threshold between the first user interface and the second user interface, and a design choice of the second user interface. Receiving the request for invoking the first function includes receiving a user selection to invoke the first function via the second user interface. The second user interface is different from the first user interface. The actions further include transmitting data associated with network connectivity along with the instruction configured to invoke the first function in the second user interface. Invoking the first function in the application associated with the second user interface includes: invoking the first function using a first execution based on the data associated with network connectivity indicating a first type of network connection; and invoking the first function using a second execution based on the data associated with network connectivity indicating a second type of network connection.

The details of one or more embodiments are set forth in the accompanying drawings and the description below. Other features and advantages will become apparent from the description, the drawings, and the claims.

BRIEF DESCRIPTION OF THE DRAWINGS

FIG. 4 depicts a comparative example of a functionality being executed based on received data.

FIG. 5 depicts a flow chart for a method to fetch a functionality.

DETAILED DESCRIPTION

This disclosure generally describes a method and system for fetching functionalities across various user interfaces and providing, for execution, instructions to invoke a function that is not present at a particular user interface.

Figure 1:
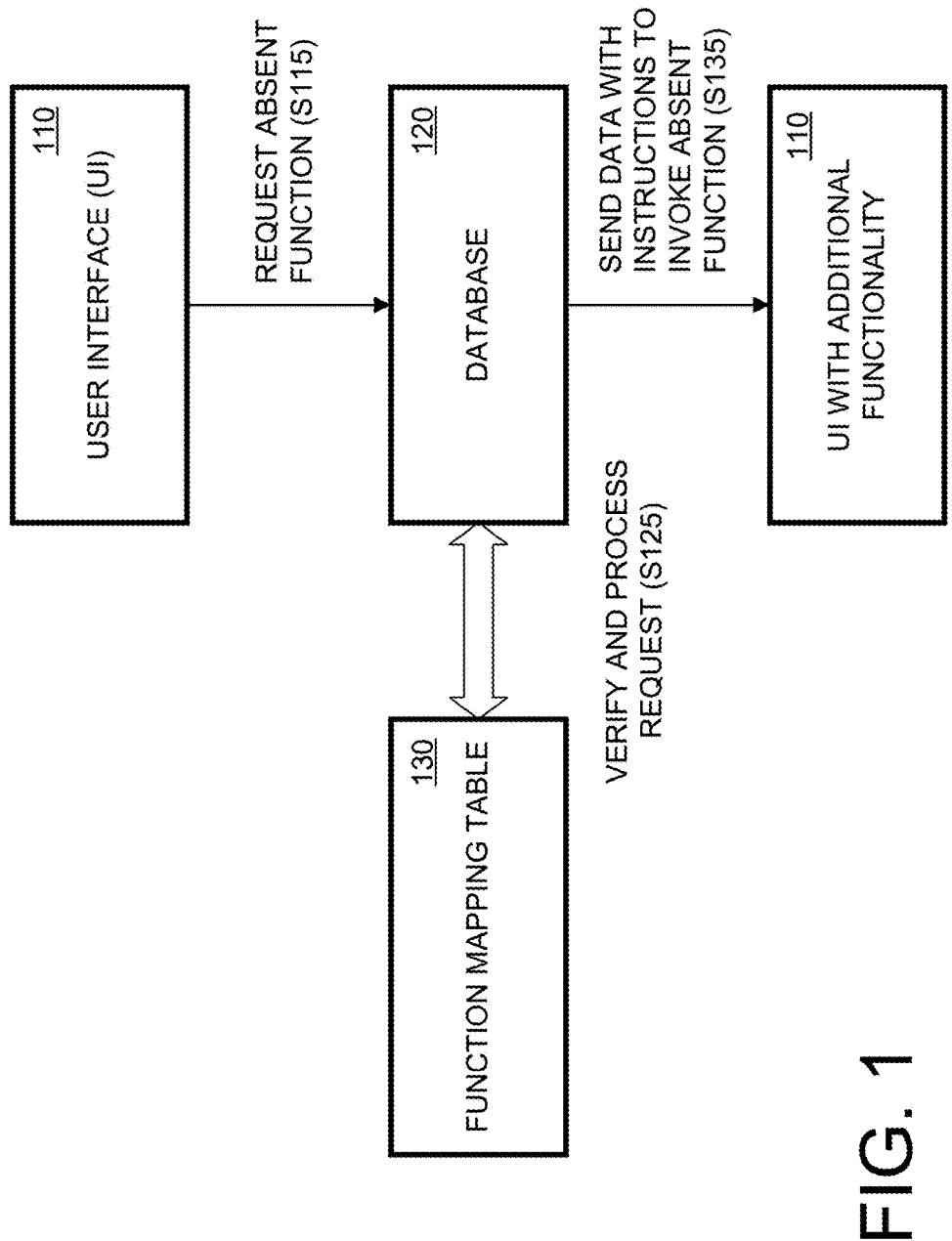
FIG. 1 depicts a block diagram illustrating a system for fetching functionalities.

According to implementations, a system may include a database that stores data associated with the functionalities of various applications available via a network, such as the Internet. The data associated with the functionalities may include instructions for invoking a particular function in one or more user interfaces. When a user accesses an application via a user interface, if a functionality associated with the accessed application is missing or absent from the user interface, the user interface may request the database to provide the absent function to the user. Accordingly, irrespective of the user interface used by the user, functionalities associated with an application may be provided to the user. For example, referring to FIG. 1, when a user accesses, executes, or installs a user interface (UI) 110, the UI 110 may search for all available functions that are compatible with the UI 110, but are not available (e.g., absent) for execution. Upon detecting one or more absent compatible functions, the UI 110 may send a request to a database 120 for instructions to invoke the absent compatible functions (S115). The database 120 verifies and processes the request (S125), in part by, searching for instructions to invoke the absent compatible functions using a function mapping table 130. After retrieving the instructions, the database 120 transmits the instructions to the UI 110 (S135). Upon receiving the instructions, the UI 110, now having data to provide the additional functionality of the absent compatible functions, may provide the user with the option to invoke or execute functions that were previously absent.

Figure 2:
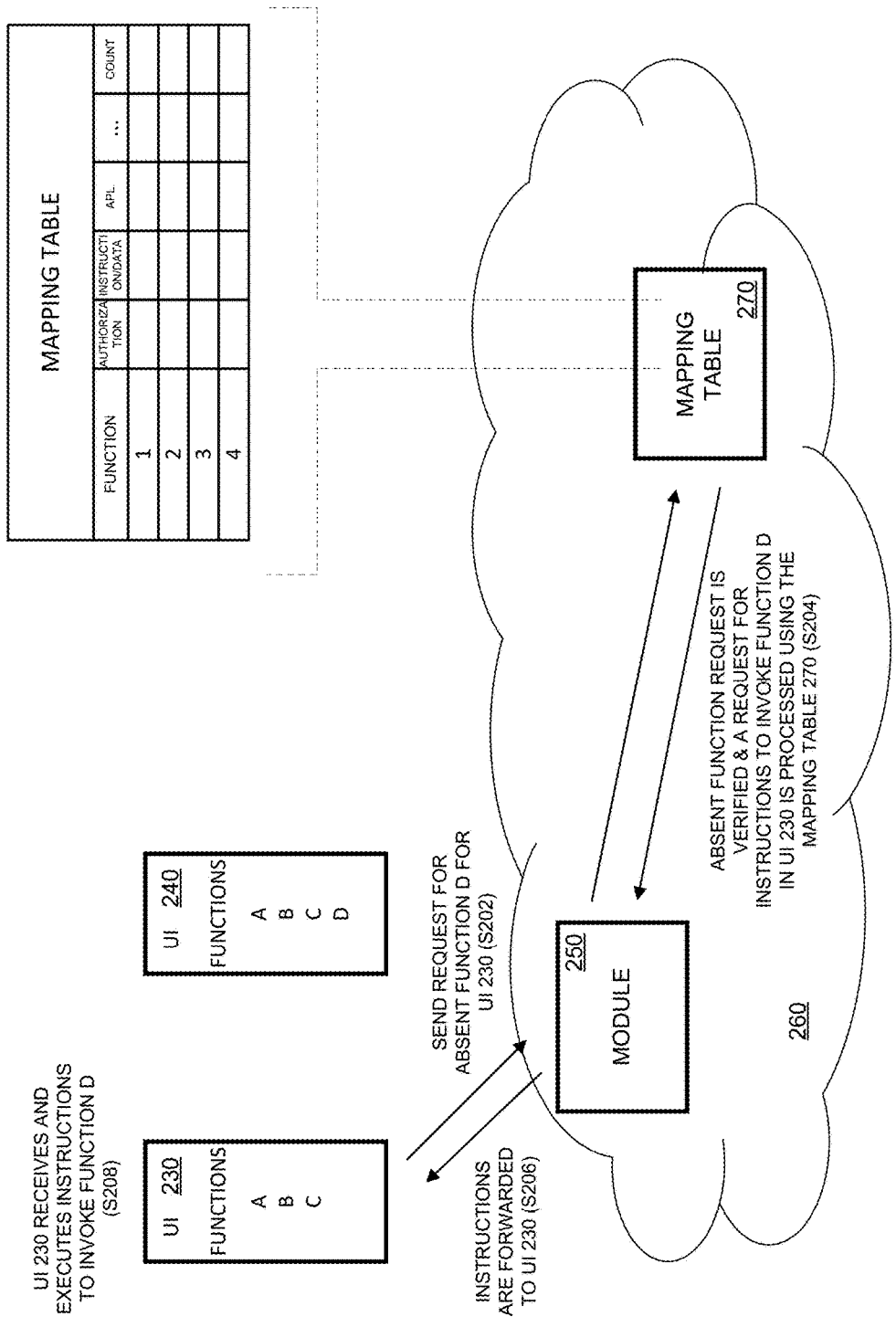
FIG. 2 depicts a block diagram illustrating a system for fetching functionalities.

FIG. 2 depicts a block diagram of a system 200 illustrating the implementations discussed above in more detail. The system 200 includes at least one UI 230 and/or 240, a module 250, a cloud system 260, and a mapping table 270. Referring to FIG. 2, a user may access one or more UIs 230 and 240. The user may access the UIs 230 and 240 when the user is, for example, attempting to download the UIs 230 and 240 or use the UIs 230 and 240 to execute any function. A UI may include any entry point for executing a function. For example, each of the UIs 230 and 240 may include an application, a device, software, hardware, and/or any other access point of a function for a user. In some implementations, when the user accesses a UI 230/240, the user may provide user credentials. For instance, the UI 230/240 may request the user to provide user credentials prior to providing access to the user. The user credentials may include, for example, a login, a password, a passkey, an image, or any unique information that may help identify the user. The user credentials may then be used to authenticate the user. The UI 230/240 or the system 200 supporting the UI 230/240 may use the user credentials to track and/or record user activities. For instance, the system 200 supporting the UI 230/240 may track all the user interfaces accessed by the user, all the functions invoked by the user, and, in general, any activity of the user on the system 200. The user activities may be used to generate a user profile of the user including, for example, information associated with user preferences, user devices, a count and/or frequency of functions executed by the user, a personality profile of the user reflecting the user's interests (e.g., shopping, sports, search interests), location information, and a social network profile reflecting the user's social network. The generated user profile may be sent to each of the user interfaces (e.g., 230, 240) associated with the user, the mapping table 270, and/or the module 250.

When the user accesses one or more of the UIs 230 and 240, each of the UIs 230 and 240 may determine: i) functions that are compatible with the respective UI and are executable by the respective UI at the time the user access the respective UI; and ii) any functions that are compatible with the respective UI but are not executable by the respective UI at the time the user access the respective UI. For example, the UI 230 may be a web browser application that determines that it is compatible with and can execute Google™ search functionality. The web browser application may also determine that it is compatible with but cannot execute a voice-based search functionality. In another example, the UI 240 may be a mobile phone that determines that it is compatible with and can execute driving direction functions associated with the Google Maps™ mapping service or application, but UI 240 may also determine that it is compatible with but cannot execute functions associated with "ridesharing" or taxi call functions related to the Google Maps™ mapping service or application. Functions that are compatible with a UI (e.g., 230, 240) may include functions that have been designed by a programmer or designer to be executed by the UI or functions that are capable of being executed by the UI. Compatible functions may also include functions associated with another UI that is similar to the UI. The functions may be of any suitable type including functions that are configured to receive inputs, provide outputs, or process information internally within a UI.

Figure 3:
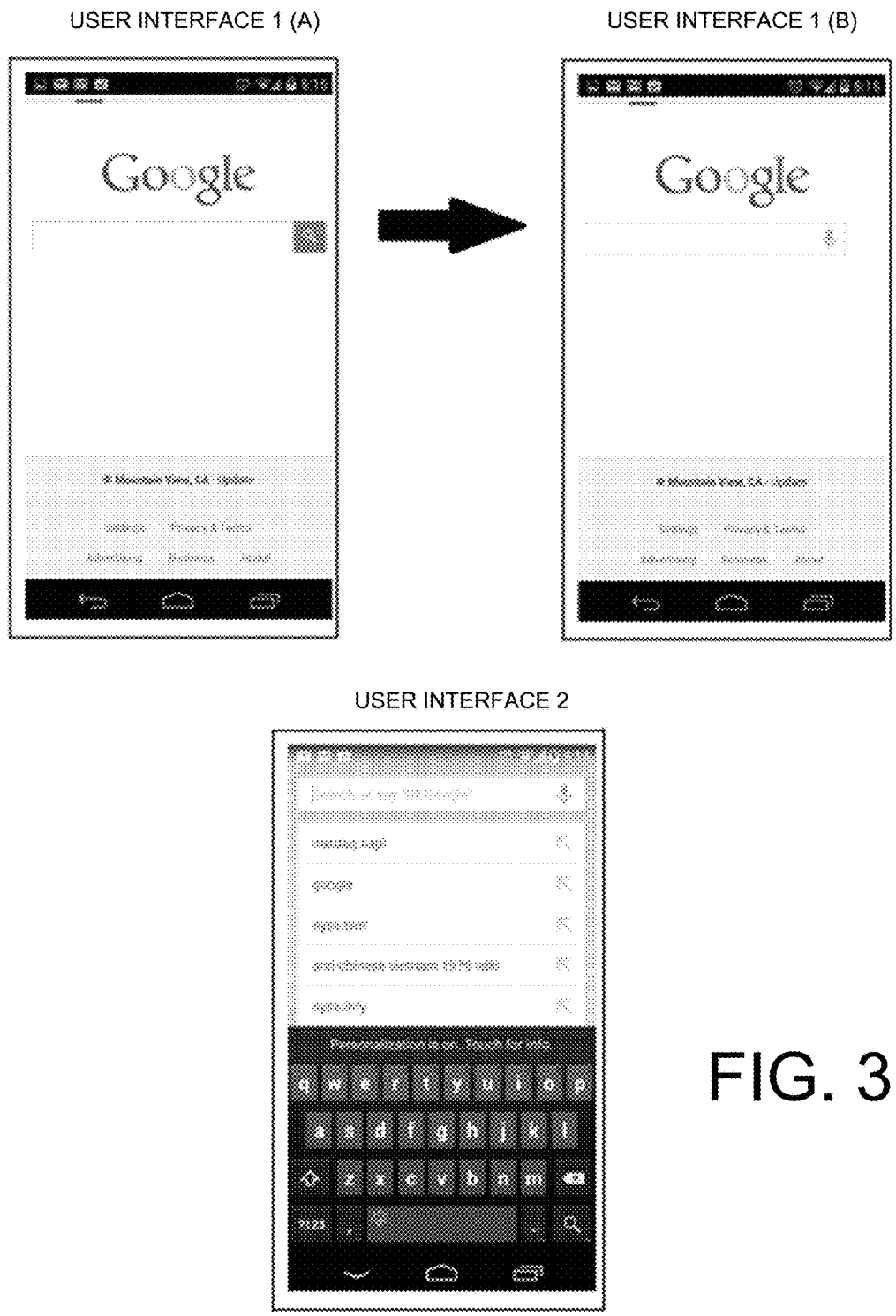
FIG. 3 depicts a comparative example of two user interfaces implementing a voice search functionality.

As shown in FIG. 2, UI 230 may include functions A, B, and C, whereas UI 240 may include functions A, B, C, and D. Here, A, B, C, and D may refer to general functions that are different from each other. UI 230 may determine that function D is compatible with UI 230, but is absent. An illustrative example is provided in FIG. 3. Referring to FIG. 3, UI 1 (A) may be a web browser application that has a Google™ search functionality, but does not have voice-based search functionality, which is an absent compatible function. In contrast, UI 2 may be a Google Search Application with Google™ search functionality and voice-based search functionality.

Referring back to FIG. 2, after identifying one or more functions, such as function D, that are compatible with the UI 230 but are not executable (e.g., absent) by the UI 230, the UI 230 may transmit a request for invoking the absent one or more functions (e.g., function D) to a module 250 (S202). The request for invoking the absent one or more functions (e.g., function D) may be generated in various manners and a priority order for provision of the absent compatible functions may be determined and provided with the request. In some implementations, a user may, through UI 230, select a particular absent compatible function as having a highest priority or as the only function the user is interested in having invoked. In some implementations, a particular absent compatible function similar to another function that is frequently executed by the user may be given higher priority than a function that is not frequently executed by the user. In some implementations, the multiple absent compatible functions may be assigned priority according to a design configuration or rules associated with the UI 230. In some implementations, a particular absent compatible function may be assigned priority based on a status of the user. For instance, if UI 230 or system 200 is aware that a user of UI 230 is moving or traveling by car through, for example, one or more suitable motion detectors, the UI 230 may prioritize functions associated with traveling such as Google Map™-related functions or "ridesharing"-related functions. In some implementations, a priority may be assigned randomly to the requested multiple absent compatible functions.

The request for invoking the absent one or more functions (e.g., function D) may be transmitted using any suitable messaging mechanism. For instance, the request may be transmitted through data packets configured in any suitable protocol, e.g., a scripting language, a remote procedure call, an email, an application programming interface (API), Simple Object Access Protocol (SOAP) methods, Common Object Request Broker Architecture (CORBA), HTTP (Hypertext Transfer Protocol), REST (Representational State Transfer), any interface for software components to communicate with each other, using any other known technique for sending information from one device to another, or any combination thereof.

The transmitted request may include supplemental data in addition to the request. The supplemental data may include various types of data including, for example, information indicating at least one of a type of user interface the request is being sent from, a type of network and network connection associated with the UI 230, absent functions that are compatible and executable in the UI 230, user credentials associated with UI 230, location information of a device associated with the UI 230, social network information associated with the user, and information indicating the user's tracked activities. If the UI 230 is a device such as a portable electronic terminal, the device associated with the UI 230 may be the portable electronic terminal. If the UI 230 is an application or entry point that is provided on a device, the device associated with the UI 230 may be the device on which the application or entry point is provided. Social network information associated with the user may include information on the user's various social networks and the user's contacts (e.g., friends, peers, followers). The request including any supplemental data may be transmitted over one or more networks to the module 250.

The one or more networks may provide network access, data transport, and other services to any user interface (e.g., UI 230) connected to the one or more networks. In general, the one or more networks may include and implement any commonly defined network architectures including those defined by standards bodies, such as the Global System for Mobile communication (GSM) Association, the Internet Engineering Task Force (IETF), and the Worldwide Interoperability for Microwave Access (WiMAX) forum. For example, the one or more networks may implement one or more of a GSM architecture, a General Packet Radio Service (GPRS) architecture, a Universal Mobile Telecommunications System (UMTS) architecture, and an evolution of UMTS referred to as Long Term Evolution (LTE). The one or more networks may implement a WiMAX architecture defined by the WiMAX forum or a Wireless Fidelity (WiFi) architecture. The one or more networks may include, for instance, a local area network (LAN), a wide area network (WAN), the Internet, a virtual LAN (VLAN), an enterprise LAN, a layer 3 virtual private network (VPN), an enterprise IP network, or any combination thereof.

The one or more networks may include one or more databases, access points, servers, storage systems, cloud systems, and modules. For instance, the one or more networks may include at least one server, which may include any suitable computing device coupled to the one or more networks, including but not limited to a personal computer, a server computer, a series of server computers, a mini computer, and a mainframe computer, or combinations thereof. The at least one server may be a web server (or a series of servers) running a network operating system, examples of which may include but are not limited to Microsoft® Windows® Server, Novell® NetWare®, or Linux®. The at least one server may be used for and/or provide cloud and/or network computing. Although not shown in the figures, the server may have connections to external systems providing messaging functionality such as e-mail, SMS messaging, text messaging, and other functionalities, such as advertising services, search services, etc.

In some implementations, the one or more networks may include a cloud system 260 that includes the module 250, mapping table 270, one or more storage systems, and the one or more servers described above. The one or more networks including the cloud system 260 may provide Internet connectivity and other network-related functions. For example, the cloud system 260 may provide storage services for at least a portion of the data transmitted between UIs 230 and 240 and mapping table 270.

Module 250 may be any type of database, including a cloud database or a database managed by a database management system (DBMS). A DBMS may be implemented as an engine that controls organization, storage, management, and retrieval of data in a database. DBMSs frequently provide the ability to query, backup and replicate, enforce rules, provide security, do computation, perform change and access logging, and automate optimization. A DBMS typically includes a modeling language, data structure, database query language, and transaction mechanism. The modeling language is used to define the schema of each database in the DBMS, according to the database model, which may include a hierarchical model, network model, relational model, object model, or some other applicable known or convenient organization. Data structures can include fields, records, files, objects, and any other applicable known or convenient structures for storing data. A DBMS may also include metadata about the data that is stored.

In some implementations, the module 250 may be coupled to a server in the one or more networks. In some implementations, the module 250 may be included in the server and/or some other connected database. In general, a functionality of the module 250 may be duplicated on, distributed across, and/or performed by one or more other devices in the one or more networks, either in whole or in part. The module 250 may be configured to send, process, and receive data to and from the UIs 230 and 240, network servers and databases, the mapping table 270, and, in general, to any device connected to the one or more networks. The data may be sent and received using any technique for sending and receiving information between processes or devices including, but not limited to, using a scripting language, a remote procedure call, an email, an application programming interface (API), Simple Object Access Protocol (SOAP) methods, Common Object Request Broker Architecture (CORBA), HTTP (Hypertext Transfer Protocol), REST (Representational State Transfer), any interface for software components to communicate with each other, using any other known technique for sending information from a one device to another, or any combination thereof. Although the module 250 and mapping table 270 have been illustrated separately, it should be understood that, in some implementations, the module 250 and mapping table 270 may be integrated into a single entity.

After receiving the request for invoking one or more absent functions (e.g., function D) from UI 230, the module 250 may verify and process the request (S204). The module 250 may extract information identifying the absent functions for which a request to invoke is received and, in some implementations, may extract user credentials from the request. Using the extracted information and/or user credentials, the module 250 may retrieve instructions for invoking the absent functions (e.g., function D) from the mapping table 270.

The mapping table 270 may be a database in the one or more networks that stores information associated with the functions. In some implementations, the mapping table 270 may be a cloud system 260-based database. Information in the mapping table 270 may be collected using various suitable means such as, for example, web crawlers, bots, and, software configured to move from one user interface to another while recording the functionalities associated with respective user interfaces. The collected information may be processed and used to generate function information that is stored in the mapping table 270. The function information may include various data associated with a respective function, such as, for example, an identification (e.g., name, serial number, code), a user interface that the respective function is executed on, user interfaces that the respective function can be executed on, execution features, authorization and access features, one or more representations of the respective function, instructions to invoke the respective functions in one or more user interfaces, and other functions that may be similar to the respective functions. Here, execution features may refer to any feature information associated with the execution of a function, such as, for example, graphical characteristics, display characteristics, desired input data, output data format, processing time of the function. Authorization and access features may refer to any feature information associated with the authorization and access of a function, such as, whether access to the function is open or restricted to certain users, passwords or membership information for accessing the function, and any system requirements for the function. The one or more representations of the respective functions may include information indicating how the function is represented and/or invoked in user interfaces. For example, a representation of a function may include a graphical representation such as an icon or image, a textual representation such as a word or hyperlink, or any other suitable representation. The instructions to invoke the respective functions in the one or more user interfaces may refer to code for the one or more user interfaces to execute the respective function, data associated with a hyperlink for executing the respective function, and, in general, any data for invoking a function in the one or more user interfaces.

In some implementations, the mapping table 270 may also be arranged and/or customized, at least in part, for each user and may include information reflecting each user's activity and interests. For example, the mapping table 270 may include various user data such as, for example, a list of user interfaces associated with the user, user/UI-provided priority order of functions, a count and/or frequency of how often each function was executed by a user interface associated with the user, a count and/or frequency of how often each function was executed by a particular user interface, and a time, date, and/or location each function was executed by a user interface associated with the user. In some implementations, all or a portion of the user data may be provided by the user through any UI associated with the user. In some implementations, the user data may be used to determine user preferences and a priority order of which functions to provide for invocation to a user interface. For instance, based on the user data, the module 250 may determine that upon accessing UI 240, the user most frequently requests invocation of an image acquisition function. Accordingly, when the user next accesses UI 240, the module 250 may provide data for invoking an image acquisition function before providing data for invoking other functions.

The mapping table 270 may be updated in real-time, periodically, or according to a schedule set by an administrator of system 200. For instance, in some implementations, the mapping table 270 may be updated as information about a new application, function, device, or user interface is generated and received. In some implementations, the mapping table 270 may be scheduled to be updated on a daily basis, weekly basis, or any determined time period. In some implementations, the mapping table 270 may be updated based on instructions transmitted by an administrator of the system 200.

Referring back to FIG. 2, the module 250 may verify and process the request (S204) by verifying the user credentials, user authorization, and/or respective function information by referring to the mapping table 270. After extracting information identifying the absent one or more functions (e.g., function D) for which a request to invoke is received, the module 250 may determine whether UI 230 is authorized to execute the absent one or more functions. For example, if the request for the absent one of more functions includes a request for a voice-based search functionality for performing a Google™ search in a web browser application, the module 250 may determine that no authorization is required to access the voice-based search functionality. In another example, if the request for the absent one of more functions includes a request for invoking a "ridesharing" function in a Google Maps™ application, the module 250 may determine that "ridesharing" membership or some other form of authorization is desirable to provide instructions for invoking the "ridesharing" function. If the module 250 determines that authorization is needed to provide instructions for invoking the absent one of more functions, the module 250, in some implementations, may refer to the user credentials to determine if a user of UI 230 is authorized for access to the absent one of more functions, or, in some implementations, may prompt a user through the UI 230 to provide authorization information for accessing the requested absent one or more functions. It should be understood that authorization for executing a function in a user interface (e.g., UI 230) may be based on the type of function being requested and/or the type of user interface on which the function is to be executed. After retrieving the authorization information from the user credentials and/or from the user through UI 230, module 250 may determine whether the UI 230 is authorized to receive instructions for invoking the requested absent one or more functions.

After verifying that the UI 230 is authorized to receive instructions for invoking the one or more absent functions, the module 250 may refer to the mapping table 270 to retrieve instructions for invoking the absent one or more functions. For example, if the request to invoke one or more absent functions includes a request to invoke function D, module 250 searches the mapping table 270 for information associated with function D, and instructions for invoking function D in UI 230 are obtained from the mapping table 270. The instructions for invoking a function (e.g., function D) may include data associated with the execution features, as described above, one or more representations of the function, code for UI 230 to invoke the function, data associated with a hyperlink for executing the function, and, in general, any data for invoking the function in UI 230.

If the request to invoke one or more absent functions includes a request to invoke multiple absent functions, the module 250 may look up mapping table 270 and may, in some implementations, determine a priority order for providing the instructions to invoke the multiple absent functions in UI 230 based on the user/UI provided priority or the user profile. For example, if the multiple absent functions includes an audio playback function and an image acquisition function, and the user profile indicates that the user invokes the audio playback function more often than the image acquisition function in UI 230, the module 250 may prioritize provision of the instructions to invoke the audio playback function relative to a provision of the instructions to invoke the image acquisition function. The priority order may be determined based on various suitable factors, and is not limited to being determined based on a frequency of execution of the requested one or more absent functions. For example, in some implementations, a user or UI associated with the user may provide a priority order or customization information to customize a priority order for receiving the instructions to invoke the multiple absent functions. The customization information may be stored in the mapping table 270 and may be received from any user interface associated with the user. In some implementations, a function that is similar to a frequently executed function may be prioritized relative to a function that is not similar to a function frequently executed by the user. A comparison may be performed between each of the requested absent functions and a history of the user executed functions to determine the similarity between functions. In some implementations, a particular function of the requested absent functions may be set by the UI 230 to have the highest priority of the multiple absent functions. In some implementations, a priority order may not be determined, and instructions for invoking multiple absent functions may be provided simultaneously to the UI 230.

Referring back to FIG. 2, after retrieving the instructions for invoking the one or more absent functions (e.g., function D) from the mapping table 270, the module 250 may forward the instructions to UI 230 (S206). In some implementations, the module 250 may also transmit additional data to the UI 230. The additional data may include, but is not limited to, for example, network data such as network congestion, network connectivity between the UI 230 and the one or more networks, cloud account information, and access information associated with the UI 230 and/or a user of the UI 230. The module 250 may transmit data indicating that a connection between the UI 230 and the one or more networks is, for example, slow, fast, or medium. The module 250 may transmit data indicating that the one or more networks are congested or not congested. The module 250 may transmit data providing information on the cloud storage space and/or access information associated with the UI 230 and/or a user of the UI 230. This information may include, for example: information indicating an amount of cloud storage being used or remaining associated with the UI 230 and/or the user of the UI 230; information indicating whether the UI 230 and/or the user of the UI 230 has full, limited, or no access to the requested one or more absent functions; and information associated with a subscription status of a cloud account associated with the UI 230 and/or the user of the UI 230.

In some implementations, all or a portion of the additional data, such as, for example, network congestion data and network connectivity data, may be obtained by the UI 230 separately from the instructions provided by the module 250 in response to the request for invoking one or more absent functions. For example, the additional data may be obtained by the UI 230 on a periodic basis (e.g., hourly, daily, every 10 minutes) or according to a scheduled time (e.g., 3 post meridiem (PM), midnight, noon). In general, the UI 230 may obtain the additional data at any suitable time, including, for example, when instructions are received in response to a request for invoking one or more absent functions.

Referring back to FIG. 2, upon receiving the instructions for invoking the one or more absent functions, the UI 230 may execute the received instructions and invoke the one or more absent functions (e.g., function D) (S208). In some implementations when multiple absent functions are requested to be invoked and no priority order is included in the request, along with receiving instructions for invoking the multiple absent functions, the UI 230 may also receive data indicating a priority order in which the instructions for invoking the multiple absent functions are to be executed or a priority order in which the instructions for invoking the multiple absent functions will be transmitted from the module 250 to the UI 230. For instance, the priority order may include information indicating that a first function (e.g., image acquisition function) is to be invoked before other functions (e.g., audio playback function). The UI 230 may invoke the multiple absent functions based on the priority order.

In general, the UI 230 may execute the received instructions in various suitable manners. In some implementations, upon receiving the instructions from module 250, the UI 230 may execute the received instructions and may, using the received instructions, automatically execute the one or more absent functions (e.g., function D) without any user input. For example, if the requested one or more absent functions includes a voice-based search functionality, the UI 230 may execute the voice-based search functionality without any user input according to the received instructions for invoking the voice-based search functionality. The received instructions for invoking the voice-based search functionality may include code or any suitable software for implementing the voice-based search functionality in UI 230.

In some implementations, the UI 230 may provide a link for executing the function. Upon receiving the instructions from module 250, the UI 230 may provide, for display, a link to a document (e.g., web page) or interface through which a requested absent function may be executed. For example, if the request for the absent one of more functions includes a request for invoking a "ridesharing" function in a Google Maps™ application, the UI 230 may provide a link to the "ridesharing" application or a document through which the "ridesharing" function may be executed. The link may be provided in any suitable manner (e.g., alphanumeric text, symbol, image).

In some implementations, the UI 230 may execute the instructions by providing one or more graphical representations (e.g., icons) associated with the one or more absent functions, respectively. Information for providing the one or more graphical representations (e.g., icons) may be included in the received instructions. As an example, if the one or more absent functions includes a voice-based search functionality, the UI 230 may provide for display a "microphone" icon that represents the voice-based functionality. For instance, as shown in FIG. 3, UI 1 (A), which may correspond to UI 230, has been modified to UI 1 (B) by replacing a "magnifying glass" icon with a selectable "microphone" icon. In contrast, UI 2, which may correspond to UI 240, includes a voice-based functionality, as shown by the illustrated "microphone" icon, and therefore a request for a voice-based functionality (e.g., function D) was not sent by UI 240. The provided one or more graphical representations associated with the one or more absent functions, respectively, may, in some cases, be selected by the user using any suitable means (e.g., mouse-click, roll over, audio selection, tactile selection). Upon receiving a selection, the function associated with the selected one of the one or more graphical representations may be executed. For example, referring again to FIG. 3, if a user selects the "microphone" icon displayed in UI 1 (B), the UI 1 may activate a microphone to receive one or more words uttered by the user and populate the search field according to the received one or more words. In some cases, a function associated with the selected one of the one or more graphical representations may be executed without receiving any user selection of the one or more graphical representations. Accordingly, in some cases, when the "microphone" icon is displayed in UI 1 (B), the UI 1 (B) is prepared to receive an audio signal and fill in the search field with words detected in the audio signal. Word detection in the audio signal may be performed using any suitable speech-to-text conversion method.

FIG. 4 provides an example of a UI using received instructions for invoking a function, additional data, and a speech-to-text conversion. Referring to FIG. 4, device 410 may be a portable electronic device. Examples of a portable electronic device include, but are not limited to, a computer, lap top, personal digital assistant, electronic pad, electronic notebook, telephone, smart phone, television, smart television, a watch, smart glasses, or any electronic device that is connected to a network and has a display. Device 410 may correspond to UI 230. Device 410 has requested module 250 (not shown in FIG. 4) for instructions to invoke a voice search functionality. In response, module 250 has sent instructions for invoking the voice search functionality to device 410 and/or has sent additional data associated with network connectivity of device 410 with the one or more networks. In some implementations, device 410 may include a detector 410-A for obtaining additional data, such as data associated with the network connectivity. Accordingly, device 410 may obtain additional data using detector 410-A and/or using the instructions for invoking the voice search functionality. Detector 410-A may be any suitable detector that can directly or indirectly obtain the additional data (e.g., directly or indirectly detect network connectivity).

In some implementations, a UI, such as device 410, may execute the received instructions for invoking the voice search functionality based, at least partly, on the additional data. Device 410 may extract information from the additional data, determine characteristics associated with the additional data, and execute a requested absent function based on the determined characteristics. For example, device 410 may extract information from the additional data provided by detector 410-A or module 250 and determine whether a weak, strong, or mediocre connection exists with one or more networks (e.g., WiFi network) the device 410 is connected to. If the device 410 determines, for example, that a strong network connection exists, device 410 may execute the voice search functionality by providing, for display, a "microphone" icon and live text corresponding to a received audio signal, and by filling in a search field with words detected in the audio signal in a real-time manner using a speech-to-text convertor. As shown in FIG. 4, a display 410-B of device 410 displays the text "how tall is barack" in a live, real time manner. A graphical representation, such as " . . . ," may be displayed to indicate that additional words are to follow the displayed words and/or that the audio signal has not terminated.

If the device 410 determines, for example, that a weak network connection exists, device 410 may execute the voice search functionality by providing, for display, a "microphone" icon, providing for display a braille output corresponding to a received audio signal (as shown in display 410-C), and completing a search field once all the words in the received audio signal have been received or the received audio signal has terminated. Accordingly, based on the additional data, execution of the requested absent function in a UI may be modified. In the example described above, device 410 executes a voice search function in a particular manner (e.g., using a speech-to-text convertor to provide for display live text corresponding to a received audio signal and fill the search field in a real-time, live manner) if the additional data provides data indicative of a particular characteristic (e.g., strong network connection). In contrast, device 410 may execute a voice search function in another manner (e.g., using a braille output corresponding to a received audio signal and filling in the search field once all the words in the audio signal have been received or the audio signal has terminated) if the additional data provides data indicative of another characteristic (e.g., weak network connection).

FIG. 5 depicts a flow chart for a method implemented by system 200 to fetch functionalities across applications. An identity database may be built in which user information and credentials are stored (S502). User credentials may be received from a user through any UI connected to the one or more networks including, for example, the cloud system 260. The user credentials may include, for example, a login, a password, a passkey, an image, or any unique information that may help identify the user. User credentials may be used to determine whether a UI associated with a user should be granted access to a function and to authenticate a user or a UI. The user credentials and information may be used to track and/or record user activities and generate a user profile. For instance, the system 200 may track all the user interfaces accessed by the user, all the functions invoked by the user, and, in general, any activity of the user on the system 200. A generated user profile of a user may include, for example, information associated with user preferences, user devices, a count and/or frequency of functions executed by the user, a personality profile of the user reflecting the user's interests (e.g., shopping, sports, search interests), location information, and a social network profile reflecting the user's social network. In some implementations, the user information and credentials may be used to determine user preferences and a priority order of which functions to provide for invocation to a user interface. A generated user profile may be sent to one or more UIs associated with the user, the mapping table 270, and/or the module 250. In some implementations, user profiles may be incorporated into the module 250 or a mapping table 250 to customize the mapping table 250 based on user profiles.

The system 200 may also collect information associated with functionalities across various UIs connected to the one or more networks (S504). In some implementations, the module 250 may control collection of the information associated with functionalities across various UIs, and may store the collected information in mapping table 270. The mapping table 270 may be a database in the one or more networks that stores information associated with the functions. Information associated with functionalities across various UIs may be collected using various suitable means such as, for example, web crawlers, bots, and, software configured to move from one user interface to another while recording the functionalities associated with respective user interfaces. The collected information may be processed and used to generate function information that is stored in the mapping table 270. The function information may include various data associated with a respective function, such as, for example, an identification (e.g., name, serial number, code), a user interface that the respective function is executed on, user interfaces that the respective function can be executed on, execution features, authorization and access features, one or more representations of the respective function, instructions to invoke the respective functions in one or more user interfaces, and other functions that may be similar to the respective functions. Here, execution features may refer to any feature information associated with the execution of a function, such as, for example, graphical characteristics, display characteristics, desired input data, output data format, processing time of the function. Authorization and access features may refer to any feature information associated with the authorization and access of a function, such as, whether access to the function is open or restricted to certain users, passwords for accessing the function, and any system requirements for the function. The one or more representations of the respective functions may include information indicating how the function is represented and/or invoked in user interfaces. For example, a representation of a function may include a graphical representation such as an icon or image, a textual representation such as a word or hyperlink, or any other suitable representation. The instructions to invoke the respective functions in the one or more user interfaces may refer to code for the one or more user interfaces to execute the respective function, data associated with a hyperlink for executing the respective function, and, in general, any data for invoking a function in the one or more user interfaces.

Information in the mapping table 270, including user identity data and information corresponding to functions and characteristics associated with the functions, may be updated in real-time, periodically, or according to a schedule set by an administrator of system 200.

Next, the system 200 may receive a request to provide instructions to invoke an absent compatible function from a requesting UI (S508). For example, module 250 may receive the request to provide instructions to invoke an absent compatible function from UI 230 (S508). In response to receiving the request, the system 200 (e.g., module 250) may determine whether the requested instructions (e.g., instructions to invoke an absent compatible function in the requesting UI) are available or stored by referring to the mapping table 270 (S510). If the requested instructions are not available or stored, the system 200 (e.g., module 250) may transmit a message to the requesting UI indicating that instructions for invoking the absent compatible function are not available (S516).

If the requested instructions are available or stored in the system 200, the system 200 (e.g., module 250) may determine whether the requesting UI or a user associated with the requesting UI is authorized to invoke the absent compatible function in the requesting UI (S512). The system 200 (e.g., module 250) may determine whether the requesting UI or a user associated with the requesting UI is authorized to invoke the absent compatible function by checking user credential information and determining whether the user is authorized to access. For example, if the requesting UI has requested information for invoking a "ridesharing" function, the module 250 may determine whether a user associated with the requesting UI has "ridesharing" membership or is authorized to execute the "ridesharing" function by checking user credentials. The module 250 may check the user credentials to access user memberships and authorization information, such as memberships and authorization to execute the "ridesharing" function. In some implementations, if "ridesharing" membership or authorization to execute the "ridesharing" function is not available, the system 200 (e.g., module 250) may prompt a user, through the requesting UI, to provide authorization information (e.g., login, password) for executing the "ridesharing" function. If the system 200 determines that the user associated with the requesting UI does not have "ridesharing" membership or is not authorized to execute the "ridesharing" function after prompting the user, the system 200 (e.g., module 250) may transmit a message indicating that the requesting UI is not authorized to invoke a requested absent function (e.g., "ridesharing" function) (S518). It should be understood that authorization for executing a function in a UI may be based on the type of function being requested and/or the type of user interface on which the function is to be executed.

If the requesting UI or a user associated with the requesting UI is authorized to invoke the absent compatible function in the requesting UI, the system 200 may transmit instructions for invoking the absent compatible function to the requesting UI (S514). For example, module 250 may obtain instructions for invoking the absent compatible function by referring to the mapping table 270 and transmit the instructions for invoking the absent compatible function to the requesting UI. In some implementations, the module 250 may extract data from the request for instructions received from the requesting UI, and identify a function for which instructions to invoke are being requested. The module 250 may then look up the identified function in the mapping table 270 and obtain instructions for invoking the identified function in the requesting UI that are mapped to the identified function in the mapping table 270. The obtained instructions are then transmitted to the requesting UI. These instructions are subsequently used by the requesting UI to invoke the absent compatible function.

A number of implementations have been described hereinabove. It should however be understood that various modifications may be made without departing from the spirit and scope of the disclosure. For example, various forms of the flows shown above may be used, with steps re-ordered, added, or removed. Accordingly, other implementations are within the scope of the disclosure and claims.

In addition, although examples with reference to voice search functions, Google Maps® mapping service or application, "ridesharing" functions, image acquisition functions, and audio playback functions have been described hereinabove, it should be understood that the disclosed implementations may be utilized to fetch and provide any function connected to one or more networks, such as the Internet, in any suitable user interface.

Embodiments and all of the functional operations and/or actions described in this specification may be implemented in digital electronic circuitry, or in computer software, firmware, or hardware, including the structures disclosed in this specification and their structural equivalents, or in combinations of one or more of them. Embodiments may be implemented as one or more computer program products, e.g., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus"

encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both.

Elements of a computer may include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer may not have such devices. Moreover, a computer may be embedded in another device, e.g., a tablet computer, a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments may be implemented on a computer having a display device, e.g., a cathode ray tube (CRT), liquid crystal display (LCD), or light emitting diode (LED) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments may be implemented in a computing system that includes a back end component, e.g., as a data server, or that includes a middleware component, e.g., an application server, or that includes a front end component, e.g., a client computer having a graphical user interface or a Web browser through which a user may interact with an implementation, or any combination of one or more such back end, middleware, or front end components. The components of the system may be interconnected by any form or medium of digital data communication, e.g., a communication network.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while actions are depicted in the drawings in a particular order, this should not be understood as requiring that such actions be performed in the particular order shown or in sequential order, or that all illustrated actions be performed, to achieve desirable results. For example, in some implementations of FIG. 5, action S504 may be performed before or at the same time as action S502, and action S512 may be performed before or at the same time as action S510. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular embodiments have been described. Other embodiments are within the scope of the following claims.

For example, the actions recited in the claims may be performed in a different order and still achieve desirable results.

What is claimed is:

1. A computer-implemented method comprising:
   receiving i) data identifying a first function associated with a first user interface, and ii) instructions for invoking the first function in one or more user interfaces;
   receiving, from a second user interface that is different than the first user interface, a request for invoking the first function;
   determining, by one or more processors, whether the second user interface is authorized to execute the first function and whether user credentials of a user associated with the second user interface are valid;
   in response to determining that the second user interface is authorized to execute the first function and the user credentials of the user associated with the second user interface are valid, selecting, using the one or more processors, an instruction configured to invoke the first function in the second user interface;
   transmitting the instruction to the second user interface; and
   invoking, using the transmitted instruction, the first function in an application associated with the second user interface.

2. The computer-implemented method of claim 1, wherein:
   receiving the request comprises receiving the user credentials of the user associated with the second user interface; and
   the one or more user interfaces comprise applications, devices, and entries to the applications associated with the user.

3. The computer-implemented method of claim 1, wherein:
   the second user interface is associated with a plurality of functions arranged according to a priority order;
   the first function has the highest priority in the priority order of the plurality of functions associated with the second user interface; and
   the priority order is based on at least one of a frequency of use of the first function by a user, a user customization, a user status, a similarity threshold between the first user interface and the second user interface, and a design choice of the second user interface.

4. The computer-implemented method of claim 1, wherein receiving the request for invoking the first function comprises receiving a user selection to invoke the first function via the second user interface.

5. The computer-implemented method of claim 1, further comprising:
   transmitting data associated with network connectivity along with the instruction configured to invoke the first function in the second user interface,
   wherein invoking the first function in the application associated with the second user interface comprises:
     invoking the first function using a first execution based on the data associated with network connectivity indicating a first type of network connection, and
     invoking the first function using a second execution based on the data associated with network connectivity indicating a second type of network connection.

6. The computer-implemented method of claim 1, wherein determining whether the second user interface is authorized to execute the first function and whether user credentials of a user associated with the second user interface are valid comprises:
   determining that the user associated with the second user interface is authorized to access the first function.

7. The computer-implemented method of claim 1, wherein:
   the first function includes a function not listed under a list of functions associated with the second user interface before receiving the request for invoking the first function.

8. A non-transitory computer-readable storage medium comprising instructions, which, when executed by one or more computers, cause the one or more computers to perform actions comprising:
   receiving i) data identifying a first function associated with a first user interface, and ii) instructions for invoking the first function in one or more user interfaces;
   receiving, from a second user interface that is different than the first user interface, a request for invoking the first function;
   determining whether the second user interface is authorized to execute the first function and whether user credentials of a user associated with the second user interface are valid;
   in response to determining that the second user interface is authorized to execute the first function and the user credentials of the user associated with the second user interface are valid, selecting, using the one or more computers, an instruction configured to invoke the first function in the second user interface;
   transmitting the instruction to the second user interface; and
   invoking, using the transmitted instruction, the first function in an application associated with the second user interface.

9. The non-transitory computer-readable storage medium of claim 8, wherein:
   receiving the request comprises receiving the user credentials of the user associated with the second user interface; and
   the one or more user interfaces comprise applications, devices, and entries to the applications associated with the user.

10. The non-transitory computer-readable storage medium of claim 8, wherein:
    the second user interface is associated with a plurality of functions arranged according to a priority order;
    the first function has the highest priority in the priority order of the plurality of functions associated with the second user interface; and
    the priority order is based on at least one of a frequency of use of the first function by a user, a user customization, a user status, a similarity threshold between the first user interface and the second user interface, and a design choice of the second user interface.

11. The non-transitory computer-readable storage medium of claim 8, wherein receiving the request for invoking the first function comprises receiving a user selection to invoke the first function via the second user interface.

12. The non-transitory computer-readable storage medium of claim 8, wherein the one or more computers are further configured to perform actions comprising:
    transmitting data associated with network connectivity along with the instruction configured to invoke the first function in the second user interface, and wherein invoking the first function in the application associated with the second user interface comprises:
 invoking the first function using a first execution based on the data associated with network connectivity indicating a first type of network connection, and
 invoking the first function using a second execution based on the data associated with network connectivity indicating a second type of network connection.

13. The non-transitory computer-readable storage medium of claim 8, wherein determining whether the second user interface is authorized to execute the first function and whether user credentials of a user associated with the second user interface are valid comprises:
 determining that the user associated with the second user interface is authorized to access the first function.

14. The non-transitory computer-readable storage medium of claim 8, wherein:
 the first function includes a function not listed under a list of functions associated with the second user interface before receiving the request for invoking the first function.

15. A system comprising:
 one or more computers and one or more storage devices storing instructions that are operable and when executed by one or more computers, cause the one or more computers to perform actions comprising:
  receiving i) data identifying a first function associated with a first user interface, and ii) instructions for invoking the first function in one or more user interfaces;
  receiving, from a second user interface that is different than the first user interface, a request for invoking the first function;
  determining whether the second user interface is authorized to execute the first function and whether user credentials of a user associated with the second user interface are valid;
  in response to determining that the second user interface is authorized to execute the first function and the user credentials of the user associated with the second user interface are valid, selecting, using the one or more computers, an instruction configured to invoke the first function in the second user interface;
  transmitting the instruction to the second user interface; and
  invoking, using the transmitted instruction, the first function in an application associated with the second user interface.

16. The system of claim 15, wherein:
 receiving the request comprises receiving the user credentials of the user associated with the second user interface; and
 the one or more user interfaces comprise applications, devices, and entries to the applications associated with the user.

17. The system of claim 15, wherein:
 the second user interface is associated with a plurality of functions arranged according to a priority order;
 the first function has the highest priority in the priority order of the plurality of functions associated with the second user interface; and
 the priority order is based on at least one of a frequency of use of the first function by a user, a user customization, a user status, a similarity threshold between the first user interface and the second user interface, and a design choice of the second user interface.

18. The system of claim 15, wherein receiving the request for invoking the first function comprises receiving a user selection to invoke the first function via the second user interface.

19. The system of claim 15, wherein the one or more computers are further configured to perform actions comprising:
 transmitting data associated with network connectivity along with the instruction configured to invoke the first function in the second user interface, and
 wherein invoking the first function in the application associated with the second user interface comprises:
  invoking the first function using a first execution based on the data associated with network connectivity indicating a first type of network connection, and
  invoking the first function using a second execution based on the data associated with network connectivity indicating a second type of network connection.

20. The system of claim 15, wherein:
 determining whether the second user interface is authorized to execute the first function and whether user credentials of a user associated with the second user interface are valid comprises determining that the user associated with the second user interface is authorized to access the first function; and
 the first function includes a function not listed under a list of functions associated with the second user interface before receiving the request for invoking the first function.

* * * * *

UNITED STATES PATENT AND TRADEMARK OFFICE
CERTIFICATE OF CORRECTION

PATENT NO. : 10,078,740 B2
APPLICATION NO. : 14/884978
DATED : September 18, 2018
INVENTOR(S) : Zhang et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 313 days.

Signed and Sealed this
Twenty-fifth Day of June, 2019

Andrei Iancu
*Director of the United States Patent and Trademark Office*